(12) United States Patent
Kim

(10) Patent No.: US 8,060,062 B2
(45) Date of Patent: Nov. 15, 2011

(54) METHOD AND SYSTEM FOR DISPLAYING MESSAGE INFORMATION IN MOBILE COMMUNICATION TERMINAL

(75) Inventor: Su Yeon Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 769 days.

(21) Appl. No.: 11/831,134

(22) Filed: Jul. 31, 2007

(65) Prior Publication Data
US 2008/0139176 A1    Jun. 12, 2008

(30) Foreign Application Priority Data

Dec. 7, 2006 (KR) .................. 10-2006-0123945

(51) Int. Cl.
H04M 1/725 (2006.01)
H04B 1/38 (2006.01)
H04W 4/00 (2009.01)

(52) U.S. Cl. ............ 455/412.2; 455/566; 455/466
(58) Field of Classification Search ............. 455/466, 455/412.1, 412.2, 413, 566, 567
See application file for complete search history.

(56) References Cited

U.S. PATENT DOCUMENTS

| | | | | |
|---|---|---|---|---|
| 4,985,913 A * | 1/1991 | Shalom et al. | .................. | 379/76 |
| 5,459,458 A * | 10/1995 | Richardson et al. | ......... | 340/9.15 |
| 5,559,862 A * | 9/1996 | Bhagat et al. | ................. | 455/460 |
| 5,687,216 A * | 11/1997 | Svensson | ................... | 455/412.2 |
| 5,920,826 A * | 7/1999 | Metso et al. | .................. | 455/557 |
| 6,055,423 A * | 4/2000 | Calabrese et al. | ......... | 455/412.2 |
| 6,115,617 A * | 9/2000 | Ib | ................................... | 455/564 |
| 6,374,304 B1 * | 4/2002 | Chiashi | ........................ | 709/246 |
| 6,628,935 B1 * | 9/2003 | Lawrence | .................. | 455/412.1 |
| 6,639,941 B1 * | 10/2003 | Nakano | ......................... | 375/219 |
| 6,665,531 B1 * | 12/2003 | Soderbacka et al. | ....... | 455/412.1 |
| 6,690,955 B1 * | 2/2004 | Komiyama | .................. | 455/566 |
| 6,731,926 B1 * | 5/2004 | Link et al. | .................. | 455/412.2 |
| 6,735,457 B1 * | 5/2004 | Link et al. | .................. | 455/575.1 |
| 6,977,921 B1 * | 12/2005 | Dolan | .......................... | 370/352 |
| 7,117,248 B1 * | 10/2006 | Jordan, Jr. | ..................... | 709/206 |
| 7,151,923 B2 * | 12/2006 | Boland et al. | ............. | 455/412.2 |
| 7,353,035 B1 * | 4/2008 | Kupsh et al. | .................. | 455/466 |

(Continued)

FOREIGN PATENT DOCUMENTS

KR     1020060058322     5/2006

OTHER PUBLICATIONS

3GPP Organizational Partners, "3rd Generation Partnership Project; Technical Specification Group Terminals; Technical realization of the Short Message Service (SMS); (Release 5)", Mar. 2002, 3GPP TS 23.040 V5.3.0, pp. 1-178.

*Primary Examiner* — Christopher M Brandt
(74) *Attorney, Agent, or Firm* — H.C. Park & Associates, PLC

(57) ABSTRACT

A method and system that can display information about messages that are not stored because sufficient space to store a message does not exist in a mobile communication terminal are provided. A method of displaying message information using a message server and mobile communication terminal includes storing at least two messages in the message server, generating a message including message information from the stored messages, transmitting the message to the mobile communication terminal, and acquiring and displaying the message information from the message.

24 Claims, 11 Drawing Sheets

U.S. PATENT DOCUMENTS

| | | | |
|---|---|---|---|
| 2001/0026608 A1* | 10/2001 | Beyda et al. | 379/88.13 |
| 2002/0137500 A1* | 9/2002 | Brooking et al. | 455/419 |
| 2004/0009779 A1* | 1/2004 | Qu et al. | 455/466 |
| 2004/0113807 A1* | 6/2004 | Amram et al. | 340/825.69 |
| 2004/0237109 A1* | 11/2004 | Laitinen et al. | 725/62 |
| 2005/0119019 A1* | 6/2005 | Jang | 455/466 |
| 2007/0165790 A1* | 7/2007 | Taori | 379/67.1 |
| 2007/0225020 A1* | 9/2007 | Chang | 455/466 |

\* cited by examiner

| Field | Length (bits) |
|---|---|
| SUBPARAMETER_ID | 8 |
| SUBPARAM_LEN | 8 |
| MESSAGE_TYPE | 4 |
| MESSAGE_ID | 16 |
| HEADER_IND | 1 |
| RESERVED | 3 |

FIG. 11A

| NO | MESSAGE IDENTIFIER | CENTER TIME STAMP | CALL BACK NUMBER |
|---|---|---|---|
| R 1 | 0X0001 | 06.11.11 / 09:10:25 | 01243987521 |

FIG. 11B

| NO | MESSAGE IDENTIFIER | CENTER TIME STAMP | CALL BACK NUMBER |
|---|---|---|---|
| R 1 | 0X0001 |  | 01243987521 |

FIG. 11C

| NO | MESSAGE IDENTIFIER | CENTER TIME STAMP | CALL BACK NUMBER |
|---|---|---|---|
| R 1 | 0X0001 | 06.11.11 / 09:10:25 | 01243987521 |
| R 2 | 0X0005 |  | 01243219875 |

FIG. 11D

| NO | MESSAGE IDENTIFIER | CENTER TIME STAMP | CALL BACK NUMBER |
|---|---|---|---|
| R 1 | 0X0001 | 06.11.11 / 09:10:25 | 01243987521 |
| R 2 | 0X0005 |  | 01243219875 |
| R 3 | 0X0008 |  | 01298751201 |
| R 4 | 0X0009 |  | 01298754321 |

FIG. 11E

| NO | MESSAGE IDENTIFIER | CENTER TIME STAMP | CALL BACK NUMBER |
|---|---|---|---|
| R 2 | 0X0005 |  | 01243219875 |
| R 3 | 0X0008 |  | 01298751201 |
| R 4 | 0X0009 |  | 01298754321 |

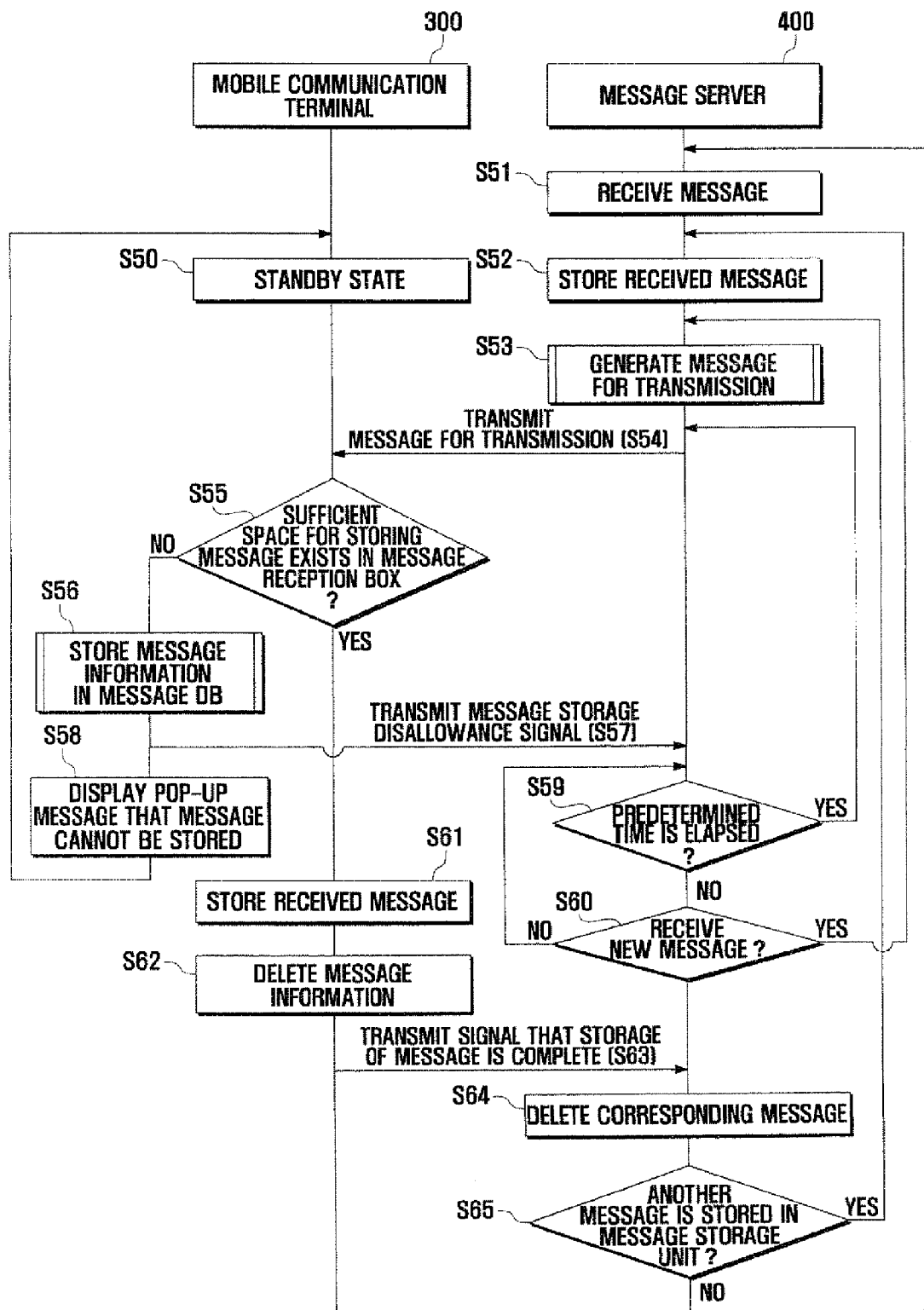

METHOD AND SYSTEM FOR DISPLAYING MESSAGE INFORMATION IN MOBILE COMMUNICATION TERMINAL

CROSS REFERENCE TO RELATED APPLICATION

This application claims priority from and the benefit of Korean Patent Application No. 10-2006-0123945, filed Dec. 7, 2006, which is hereby incorporated by reference for all purposes as if fully set forth herein.

BACKGROUND OF THE INVENTION

1. Field of the Invention

The present invention relates to a mobile communication terminal, and more particularly, to a method and system that may display information about a message that is not stored in a mobile communication terminal when received because sufficient space to store the message does not exist.

2. Discussion of the Background

In general, a mobile communication system may provide a voice communication service and various text message services such as a Short Message Service (SMS), a Multimedia Messaging Service (MMS), email, and emoticon and moving picture mail service.

Recently, as mobile communication terminals have become more widely used, the use of text message services has rapidly increased. A text message service is a service in which a user of the mobile terminal can write, transmit, and receive a text message without separate, additional equipment. Because a text message service can complete transmission of a message almost immediately after a sending operation, the use of text message services has become common.

A conventional method of receiving a text message is as follows.

When a text message is transmitted from another party, a message server receives the text message and transmits the text message to a receiver's mobile communication terminal. Accordingly, a controller of the mobile communication terminal that receives the message from the message server determines whether sufficient space to store the message exists in a message storage space (hereinafter, a message reception box) within the mobile communication terminal. If sufficient space to store the message exists in the message reception box, the controller receives the corresponding message, stores the message in the message reception box, and simultaneously displays a pop-up message on a screen, thereby notifying a user that the message has been received.

If sufficient space to store the message does not exist in the message reception box, the mobile communication terminal transmits a storage disallowance signal to the message server and displays a pop-up message to notify the user. Accordingly, the user may then delete old text messages stored in the message reception box, thereby making space to store the message.

However, even if a plurality of messages is received in the message server when there is insufficient space to store the messages in the message reception box, the conventional method of receiving message information always displays a pop-up message having the same content, i.e. that sufficient space to store a text message does not exist. Accordingly, although the user checks the pop-up message, the user may not know how many text messages are stored in the message server and by whom the text messages were transmitted.

SUMMARY OF THE INVENTION

The present invention provides a method and a system that may display information about a message that is not stored in a mobile communication terminal when received because sufficient space to store the message does not exist.

Additional features of the invention will be set forth in the description which follows, and in part will be apparent from the description, or may be learned by practice of the invention.

The present invention discloses a method of displaying message information in a mobile communication terminal, including determining, when a message is received, whether sufficient space to store the message exists and extracting, if sufficient space to store the message does not exist, information about the received message. The method further includes displaying a message storage disallowance signal including the extracted information about the received message.

The present invention also discloses a method of displaying message information using a message server and a mobile communication terminal, including storing at least two messages in the message server, generating a message including message information from the stored messages, transmitting the message to the mobile communication terminal, and acquiring and displaying the message information from the message.

The present invention also discloses a method of receiving message information in a mobile communication terminal, including receiving a message from a message server and determining whether sufficient space to store the received message exists in the mobile communication terminal. The method further includes extracting and storing, if sufficient space to store the received message does not exist in the mobile communication terminal, message information from the received message for transmission and transmitting a message storage disallowance signal to the message server.

The present invention also discloses a method of transmitting message information to a message server, including storing at least two messages in the message server according to a message storage disallowance signal from a mobile communication terminal, generating a message including message information based on the stored messages, and transmitting the message to the mobile communication terminal.

The present invention also discloses a system to display message information including a message server and a mobile communication terminal. The message server includes a message storage unit and a message management unit. The message storage unit stores at least two messages according to a message storage disallowance signal and the message management unit generates a message including message information using messages stored in the message storage unit and transmits the message. The mobile communication terminal includes a message processor and a display unit. The message processor receives the message from the message server, determines whether sufficient space to store the message exists, extracts and stores, if sufficient space to store the message for transmission does not exist, the message information, and transmits a message storage disallowance signal to the message server. The display unit displays the message information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIGS. 11A, 11B, 11C, 11D, and 11E are diagrams showing a structure of a message information database of the mobile communication terminal of FIG. 10.

FIG. 12 is a flowchart showing a method of displaying message information according to another exemplary embodiment of the present invention.

DETAILED DESCRIPTION OF THE ILLUSTRATED EMBODIMENTS

Figure 1:
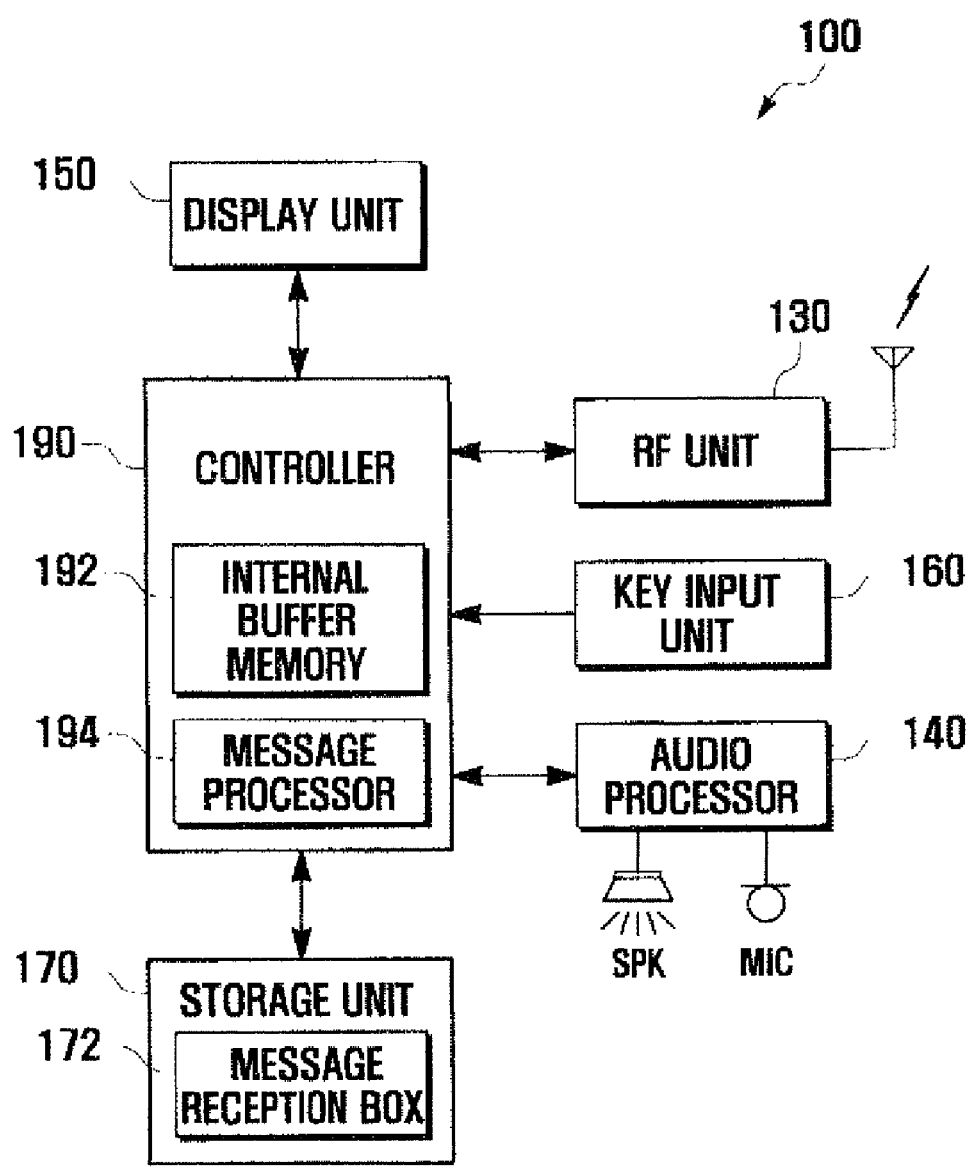
FIG. 1 is a block diagram showing a configuration of a mobile communication terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

A message described in the present invention is a text message received through an SMS.

FIG. 1 is a block diagram showing a configuration of a mobile communication terminal according to an exemplary embodiment of the present invention.

Referring to FIG. 1, the mobile communication terminal 100 includes a radio frequency (RF) unit 130, an audio processor 140, a display unit 150, a key input unit 160, a storage unit 170, and a controller 190.

The RF unit 130 transmits and receives data for wireless communication of the mobile communication terminal 100. The RF unit 130 includes an RF transmitter to up-convert the frequency of a signal to be transmitted and amplify the signal, and an RF receiver to low-noise amplify a received signal and down-convert the frequency thereof. Further, the RF unit 130 receives data through a wireless channel and outputs the data to the controller 190, and receives data output from the controller 190 and transmits the data through the wireless channel.

The audio processor 140 includes a codec (coder/decoder), and the codec includes a data codec for processing packet data and an audio codec for processing an audio signal such as a voice signal. Accordingly, the audio processor 140 converts digital audio data received by the controller 190 through the RF unit 120 to an analog audio signal through the audio codec and reproduces the analog audio signal through a speaker SPK. The audio processor 140 also converts an analog audio signal input from a microphone MIC to digital audio data through the audio codec and provides the digital audio data to the controller 190.

The key input unit 160 receives a user's operation signal to control the mobile communication terminal 100 and transfers the signal to the controller 190. The key input unit 160 includes a plurality of keys (not shown) through which numerals and characters may be input and a control key (not shown) to input commands to control the operation of the mobile communication terminal 100.

The display unit 150 displays image data output from a camera module (not shown) and from the controller 190 on a screen. The display unit 150 may use a liquid crystal display (LCD) and may include an LCD controller (not shown), memory to store data, and an LCD display element. When the LCD has touch screen capabilities, the screen of the display unit 150 may be operated as an input unit.

The storage unit 170 includes program memory and data memory. Programs to control the general operation of the mobile communication terminal 100 are stored in the program memory and a phone book including data generated while executing programs and telephone numbers is stored in the data memory. Further, the data memory of the storage unit 170 includes a message reception box 172, where text messages received by the SMS are stored.

The controller 190 controls the general operation of the mobile communication terminal 100. Further, the controller 190 determines, if a text message (hereinafter, a message) is received, whether sufficient space to store the message exists in the message reception box 172 and, if so, stores the message in the message reception box 172.

The controller 190 further includes internal buffer memory 192 and a message processor 194. Various data for use in the control operation may be stored temporarily in the internal buffer memory 192. Further, a message received from a message server (not shown) may also be stored temporarily in the internal buffer memory 192.

The message processor 194 receives a message transmitted from the message server and temporarily stores the message in the internal buffer memory 192. Further, when sufficient space for storing the message does not exist in the message reception box 172, the message processor 194 may extract a sender's information (a call back number or reply number) from the message temporarily stored in the internal buffer memory 192 and display a pop-up message containing this information in the display unit 150.

Figure 2:
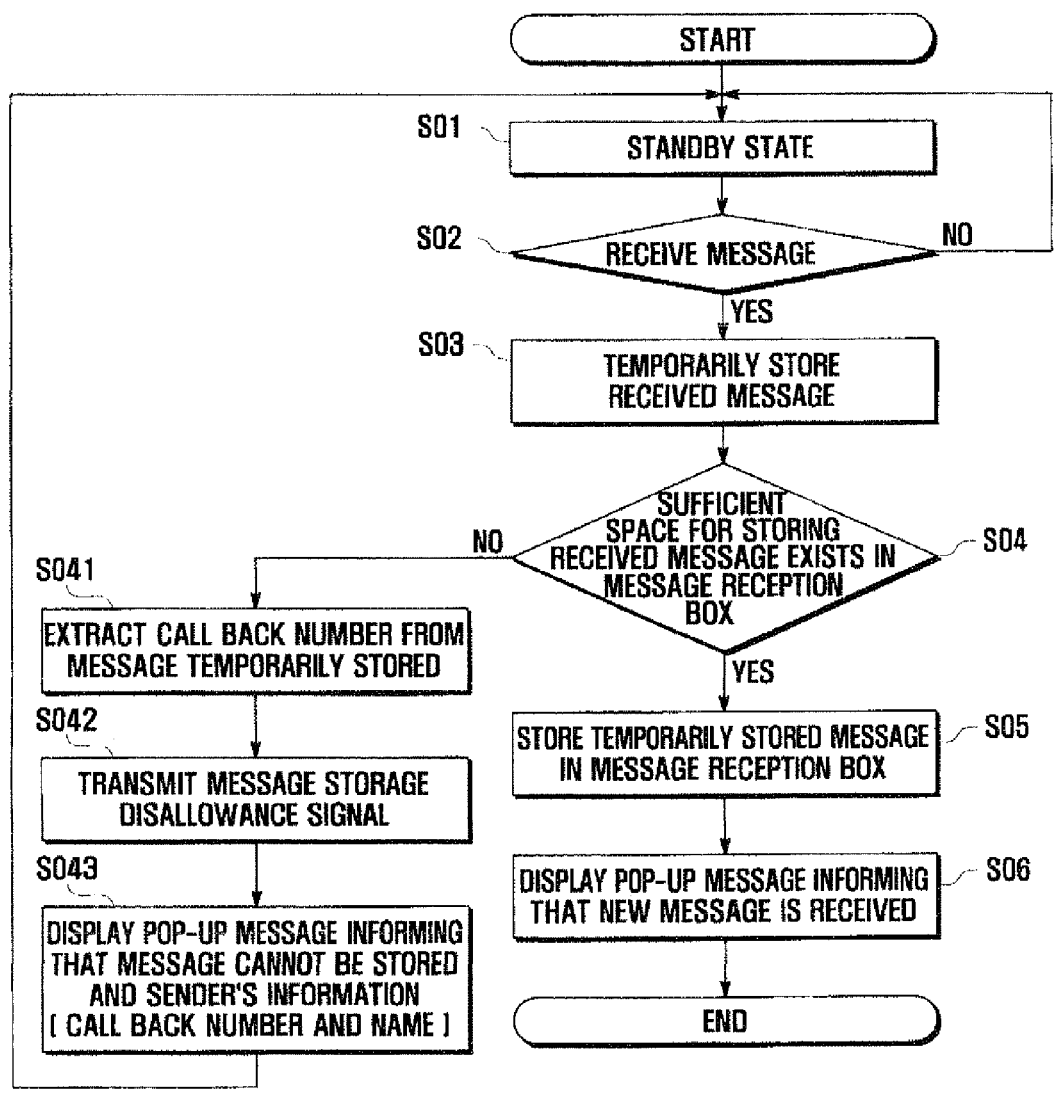
FIG. 2 is a flowchart showing a method of displaying message information according to an exemplary embodiment of the present invention.

FIG. 2 is a flowchart showing a method of displaying message information according to an exemplary embodiment of the present invention.

Referring to FIG. 1 and FIG. 2, the mobile communication terminal 100 in a standby state (S01) determines whether a message transmitted from a message server has been received (S02). If the mobile communication terminal 100 receives a message transmitted from a message server, the message processor 194 temporarily stores the received message in the internal buffer memory 192 (S03). In general, a message transmitted to the mobile communication terminal 100 includes a message identifier, a message center time stamp, user data, a call back number, etc., and such information is stored in the internal buffer memory 192. The received message may further include other parameters, but the present exemplary embodiment uses only the call back number, and thus, a description of other parameters is omitted.

Next, the message processor 194 determines whether there is sufficient space in the storage unit 170 to store the message received in the message reception box 172 (S04). If not, the message processor 194 extracts a call back number from the message temporarily stored in the internal buffer memory 192 (S041).

The message processor 194 then transmits a message storage disallowance signal to the message server (S042). The message processor 194 displays a phrase on the display unit 150 through a pop-up message (S043), informing the user that the message cannot be stored because sufficient space to store a message does not exist in the message reception box 172 in the storage unit 170. In this case, the message processor 194 may also display the call back number extracted at step S041, as shown in FIG. 3.

Figure 3:
FIG. 3 is a diagram showing an example of a screen in which a pop-up message is displayed in the method of FIG. 2.

FIG. 3 is a diagram showing an example of a screen in which a pop-up message is displayed in the method of FIG. 2.

Referring to FIG. 3, the pop-up message displays a phrase (e.g. Not enough Memory! Text Msg is rejected) indicating that the message cannot be received and, beneath the phrase, displays the sender's information, i.e. a call back number and the sender's name.

The call back number displayed in the pop-up message uses the call back number extracted at step S041. When the call back number of the received message is stored in a phone book of the mobile communication terminal 100, the sender's name is extracted from the phone book and displayed. Therefore, although not shown, the message processor 194 determines whether information corresponding to the call back number is stored in the phone book and, if so, extracts the sender's name corresponding to the call back number. In the present exemplary embodiment, only the sender's name is extracted from the phone book and the sender's name along with the call back number is displayed in a pop-up message. However, other information, such as the sender's picture, in addition to the sender's name may be extracted and displayed.

The pop-up message according to the present exemplary embodiment may indicate that a message cannot be stored because sufficient space for storing the message does not exist in the message reception box 172 and may also display the sender's information. Accordingly, the user of the mobile communication terminal 100 may easily recognize the sender of the message.

After the pop-up message is displayed (S043), the mobile communication terminal 100 returns to the standby state at step S01 and repeats the described process whenever a message is received, until the user secures sufficient space to store a message in the message reception box 172.

If sufficient space to store the message exists in the message reception box 172 at step S04, the message processor 194 stores the message, which was temporarily stored in the internal buffer memory, 192 in the message reception box 172 (S05).

The message processor 194 then displays a pop-up message on the display unit 150 informing the user that a new message has been received and including information about the message stored in the message reception box 172 (S06).

In the method of displaying message information according to the present exemplary embodiment, a sender's information is displayed through a pop-up message, even when the message is not stored in the mobile communication terminal because sufficient space to store the message does not exist. Accordingly, the user may easily recognize the sender of the received message. In the present exemplary embodiment, a call back number is used, but the present invention is not limited thereto. That is, other information included in a message that is temporarily stored in the internal buffer memory, such as the center time stamp or user data, may be displayed to the user.

In further exemplary embodiments described hereinafter, "message information" is information that may be modified or added to a message that is to be transmitted from a message server to a receiver's mobile communication terminal. A message may be generated by modifying information about the original message or adding new information about another message based on an original message stored in a message storage unit, and then transmitted from the message server to the receiver's mobile communication terminal. Because the message is only transmitted to the receiver's mobile communication terminal, although the message is newly generated, the original message stored in the message storage unit remains stored in its unchanged form.

Also, in further exemplary embodiments, "retransmission" is repeated transmission of a message transmitted from the message server to the mobile communication terminal. Although a new message is generated and transmitted, if the basic information of the message and the original message are identical, the transmission is referred to as retransmission.

Figure 4:
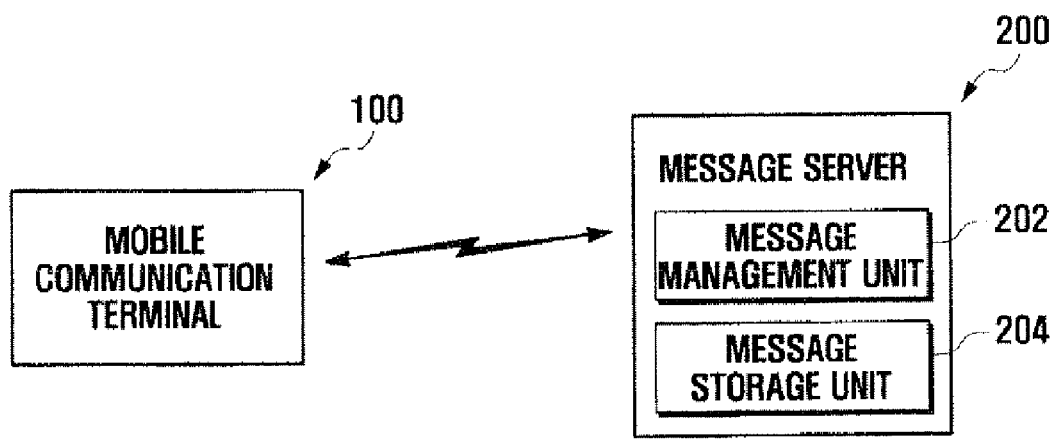
FIG. 4 is a block diagram showing a system for displaying message information according to another exemplary embodiment of the present invention.

FIG. 4 is a block diagram showing a system for displaying message information according to another exemplary embodiment of the present invention.

The mobile communication terminal 100 according to the present exemplary embodiment has the same configuration as that of the mobile communication terminal 100 according to the previously described exemplary embodiment. Accordingly, the mobile communication terminal 100 according to the present exemplary embodiment is described using the same reference numerals as those of FIG. 1.

Referring to FIG. 1, FIG. 2, FIG. 3, and FIG. 4, the message information display system includes the mobile communication terminal 100 and a message server 200.

The message server 200 receives and stores a message transmitted from a sender's mobile communication terminal (not shown) and transmits the message to a receiver's mobile communication terminal 100. The message server 200 includes a message management unit 202 and message storage unit 204.

The message storage unit 204 stores a message transmitted from the sender's mobile communication terminal.

If a message is transmitted from the sender's mobile communication terminal, the message management unit 202 stores the message in the message storage unit 204 and transmits the stored message to the receiver's mobile communication terminal 100. The message management unit 202 also transmits both the quantity of stored messages and the call back number of the most recently stored message. Further, the message management unit 202 processes a message according to the reply signal (a message storage disallowance signal or a message storage completion signal) transmitted from the receiver's mobile communication terminal 100.

The mobile communication terminal 100 receives a message from the message server 200 and transmits a reply signal to the message server 200. In the mobile communication terminal 100 according to the present exemplary embodiment, the elements other than the controller 190 perform the same function as those of the mobile communication terminal 100 according to the previously described exemplary embodiment. Accordingly, in the present exemplary embodiment, a description of elements other than the controller 190 is omitted.

The controller 190 controls the general operation of the mobile communication terminal 100. Further, if a message is received, the controller 190 determines whether sufficient space to store the message exists in the message reception box 172 and, if so, stores the message.

The controller 190 further includes internal buffer memory 192 and a message processor 194. Various data for use in the control operation is stored temporarily in the internal buffer memory 192. Further, a message received from the message server 200 is stored temporarily in the internal buffer memory 192.

If sufficient space to store a message does not exist in the message reception box 172, the message processor 194 extracts information about the message, displays the message information to notify the user, and simultaneously transmits a message storage disallowance signal to the message server 200. Message information according to the present exemplary embodiment includes the quantity of messages stored in the message server 200 and the call back number of the message most recently stored in the message server 200.

Figure 5:
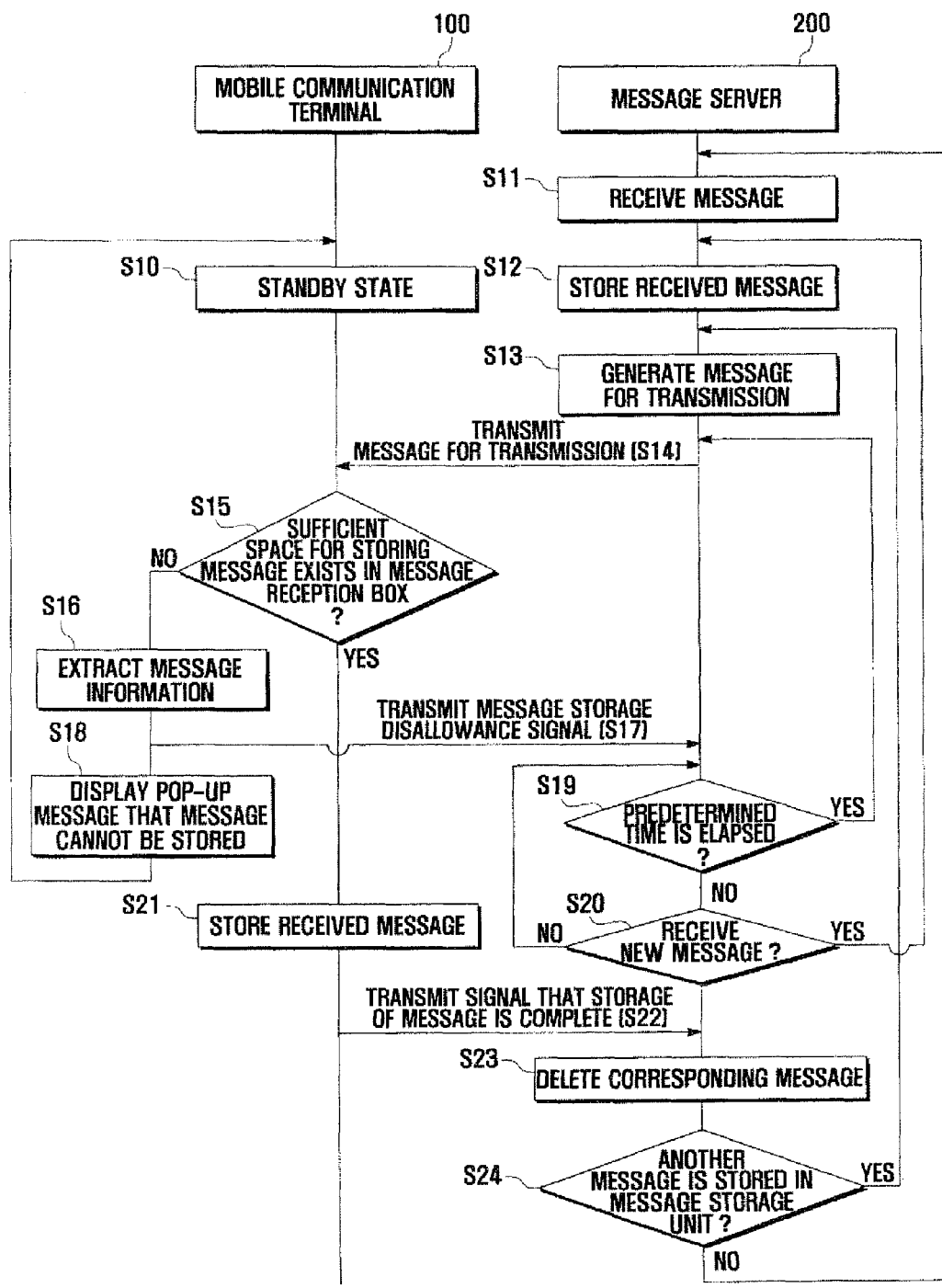
FIG. 5 is a flowchart showing a method of displaying message information according to another exemplary embodiment of the present invention.
Figures 6, 7:
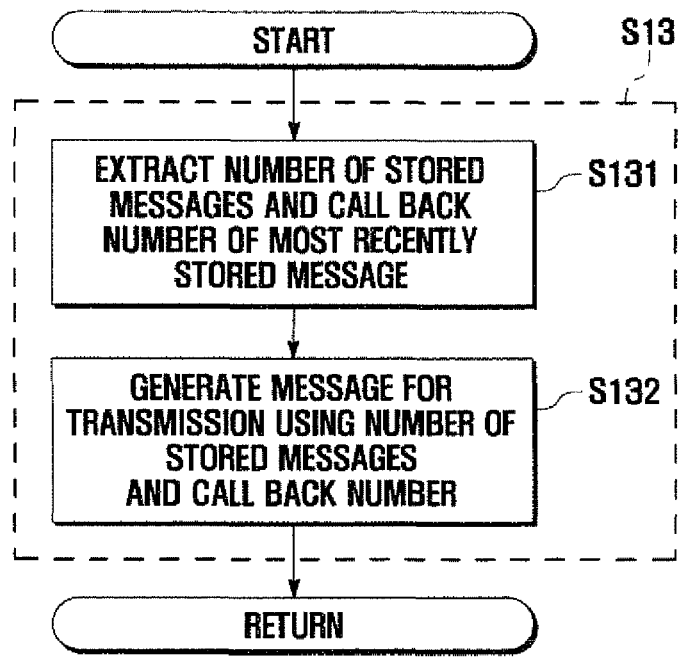
FIG. 6 is a flowchart showing a process of generating a message for transmission in the method of FIG. 5.
FIG. 7 is a table showing a structure of a message identifier parameter according to an exemplary embodiment of the present invention.

FIG. 5 is a flowchart showing a method of displaying message information according to another exemplary embodiment of the present invention. FIG. 6 is a flowchart showing a process of generating a message in the method of FIG. 5.

Referring to FIG. 1, FIG. 4, and FIG. 5, the mobile communication terminal 100 commences in a standby state (S10). If a message is received in the message server 200 (S11), the message management unit 202 stores the received message in the message storage unit 204 (S12). Next, the message management unit 202 generates a message for transmission (S13).

When the message server 200 transmits a message to the receiver's mobile communication terminal 100 (hereinafter, a receiving terminal), the message server 200 transmits stored messages sequentially, beginning with the oldest message in the message server 200, and repeatedly transmits the same message (i.e. the message that has been stored for the longest period) until the receiving terminal 100 stores the corresponding message. Accordingly, after the receiving terminal 100 stores the message transmitted by the message server 200, the message server 200 then transmits the message that has been stored in the message server 200 for the next longest period of time.

Accordingly, the receiving terminal 100 may know only information about a message transmitted from the message server 200, and may not know information (e.g. the quantity of messages or call back number) about other messages stored in the message server 200.

To overcome this disadvantage, in exemplary embodiments of the present invention, a message including message information is generated and then transmitted from the message server 200 to the receiving terminal 100.

Referring to FIG. 6, the message management unit 202 extracts the quantity of messages stored in the message storage unit 204 including a newly received and stored message and extracts the call back number of the most recently stored message (i.e. the newly received message) (S131).

Next, the message management unit 202 generates a message to be transmitted to the receiving terminal 100 using the extracted message information, i.e. the quantity of messages and the call back number (S132). In the present exemplary embodiment, a method of additionally storing message information, including the quantity of messages stored in the message server 200 and the call back number of the most recently stored message, in a reserved field of the message and transmitting the message information is used.

Hereinafter, the reserved field is briefly described as follows.

In general, a message transmitted to the mobile communication terminal 100 includes a plurality of parameters (e.g. a message identifier, user data, and a call back number), and each parameter includes a plurality of fields to store message related information.

FIG. 7 is a table showing a structure of a message identifier parameter according to an exemplary embodiment of the present invention.

As shown in FIG. 7, a message identifier parameter to display the intrinsic name of a message may include various fields such as MESSAGE_TYPE, MESSAGE_ID, and RESERVED. The RESERVED field is a field that is not used to transmit data and is included in the message identifier parameter and in several other parameters. In the present exemplary embodiment, a message may be generated by adding message information to the RESERVED field.

The message management unit 202 generates a message, using the message that has been stored for the longest period of time, to transmit to the receiving terminal 100 (S132) and stores the quantity of the stored messages extracted at step S131 using a specific reserved field of the message for transmission. Because the quantity information about the stored messages does not require many bits, a reserved field having 3 or 4 bits may be used. Similarly, the message management unit 202 stores a call back number extracted at step S131 using another reserved field in the message for transmission. In this case, because the call back number requires at least 8 bits, the call back number may be stored using a reserved field having 8 bits or in at least two reserved fields. Further, reserved fields to store the quantity of stored messages and the call back number are determined ahead of time between the receiving terminal 100 and the message server 200. Accordingly, when the message processor 194 receives a message from the message management unit 202, message information may be easily extracted from the corresponding reserved field.

Returning to FIG. 5, when the message has been generated at step S13, the message management unit 202 transmits the message to the receiving terminal 100 (S14). The controller 190 receives the message and determines whether sufficient space to store the message exists in the message reception box 172 (S15). If sufficient space to store the message exists in the message reception box 172, the controller 190 stores the received message in the message reception box 172 (S21). If sufficient space to store the message does not exist in the message reception box 172, the controller 190 notifies the message processor 194 that sufficient space to store the message does not exist in the message reception box 172.

The message processor 194 extracts information about the message received at step S14, i.e. the quantity of messages stored in the message storage unit 204 and the call back number of the message most recently stored in the message storage unit 204 (S16).

Next, the message processor 194 transmits a message storage disallowance signal to the message server 200 (S17). The message processor 194 simultaneously displays a pop-up message on the display unit 150, notifying the user that a message cannot be stored because sufficient space to store the message does not exist in the message reception box 172 (S18).

Figure 8:
FIG. 8 is a diagram showing an example of a screen in which a pop-up message is displayed in the method of FIG. 5.

FIG. 8 is a diagram showing an example of a screen in which a pop-up message is displayed in the method of FIG. 5.

Referring to FIG. 8, the pop-up message including a phrase (e.g. Not enough Memory! Text Msg is rejected) notifying the user that a message cannot be received is displayed, and beneath the phrase the quantity (i.e. 4 msgs) of messages for which reception was rejected until now is displayed. The pop-up message shown in FIG. 8, alerts the user of the mobile communication terminal 100 that 4 messages are stored in the message server 200 through the phrase 'How many rejected Msgs: 4 msgs'.

The pop-up message also displays the sender's information for the message for which reception was most recently requested, i.e. the call back number (e.g. Call Back Number: 012-9875-4321) and the sender's name (e.g. Hong Gil Dong) may be displayed. The call back number displayed in the pop-up message uses the call back number extracted at step S16. When the call back number of the received message is stored in a phone book of the mobile communication terminal 100, the sender's name is extracted from the call back number and displayed. For this reason, although not shown, the message processor 194 determines whether information corresponding to the call back number is stored in the phone book and extracts, if information corresponding to the call back number is stored in the phone book, the sender's name corresponding to the call back number. In the present exemplary embodiment, only the sender's name is extracted from the phone book and the sender's name and the call back number are displayed in the pop-up message, however, other information, such as the sender's picture, in addition to the sender's name may be extracted and displayed.

Returning to FIG. 5, the receiving terminal 100 transmits a message storage disallowance signal to the message server 200 (S17), and when a predetermined amount of time (e.g. 10 minutes) has elapsed after receiving the message storage disallowance signal from the receiving terminal 100 (S19), the message management unit 202 of the message server 200 returns to step S14 and repeats the process of transmitting the message for which reception was rejected. In this case, because the message information transmitted to the receiving terminal 100 is not further modified, the pop-up message displayed in the receiving terminal 100 continuously displays the same quantity of messages and the same call back number.

When storage of the message is rejected, if, prior to the elapse of the predetermined amount of time after receiving the message storage disallowance signal from the receiving terminal 100 at step S19, a new message is received in the message server 200 (S20), the message management unit 202 stores the received message by returning to step S12 and repeating the process of generating a message for transmission. In this way, when a new message is received in the message server 200, the message information, i.e. both the total quantity of messages stored in the message storage unit 204 and the call back number of a most recently stored message, is changed. Accordingly, if sufficient space to store a message still does not exist in the message reception box 172 at step S15, the increased quantity of messages and the call back number of the new message are displayed in a pop-up message displayed in the receiving terminal 100 at step S18. As described above, if the call back number of the new message is stored in the phone book of the mobile communication terminal 100, the sender's name corresponding to the call back number is also displayed in the pop-up message.

At step S15, if sufficient space to store the message exists in the message reception box 172 while the described processes are performed, the message processor 194 of the receiving terminal 100 stores the received message (S21) and transmits a signal notifying that storage of the message is complete to the message server 200 (S22).

Accordingly, the message server 200 deletes the message corresponding to the message stored in the mobile communication terminal 100 from the message storage unit 204 (S23). The message server 200 then determines whether another message is stored in the message storage unit 204 (S24). If another message is stored in the message storage unit 204, the message management unit 202 returns to step S13 and modifies the message information, then transmits the corresponding message to the receiving terminal 100, and repeats the described processes.

If there is no other messages stored in the message storage unit 204 at step S24, the message server 200 goes into a standby state. Then if a new message is received, the message server 200 enters into step S11 and repeats the described processes.

As described above, the method of displaying message information according to the present exemplary embodiment displays the quantity of messages stored in the message server 200 and the call back number of a message most recently stored in the message server 200 through a pop-up message. The present invention is not limited thereto, and may sequentially store a call back number in the receiving terminal 100 whenever a message is received and may display the call back numbers of all of the messages stored in the message server 200 simultaneously when a pop-up message is displayed.

Also, the method of displaying message information according to the present exemplary embodiment performed through the described process adds the quantity of messages stored in the message storage unit 204 and the call back number of a recently received message to the message and transmits the message to the receiving terminal 100. However, the present invention is not limited thereto, and may also be embodied such that the message server 200 does not directly add the quantity of stored messages to the message, but instead the receiving terminal 100 may nevertheless determine and display the quantity of messages stored in the message server 200 through other message information.

In another exemplary embodiment described hereinafter, a message information display system includes a receiving terminal and message server, and has a configuration similar to the previously described exemplary embodiments in using message information. Accordingly, in describing the exemplary embodiment hereinafter, a description of the parts that are the same as those of the previously described exemplary embodiments is omitted.

Figure 9:
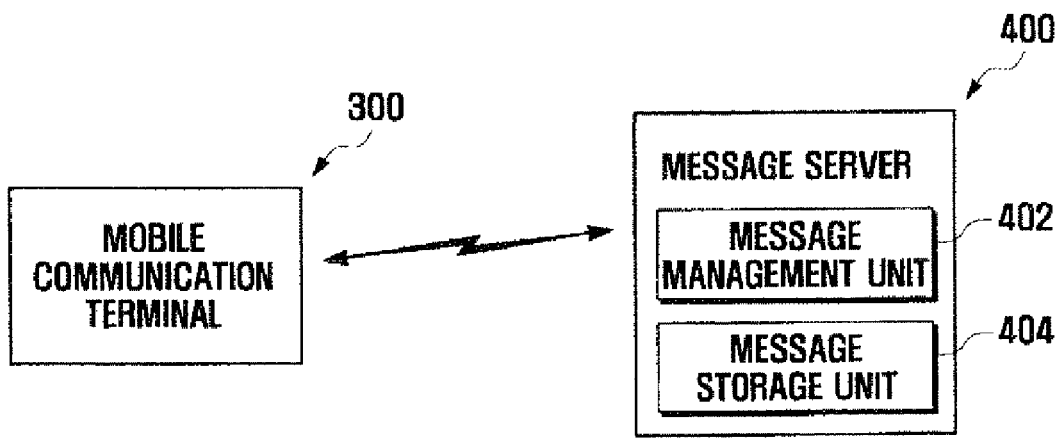
FIG. 9 is a block diagram showing a system for displaying message information according to another exemplary embodiment of the present invention.
Figure 10:
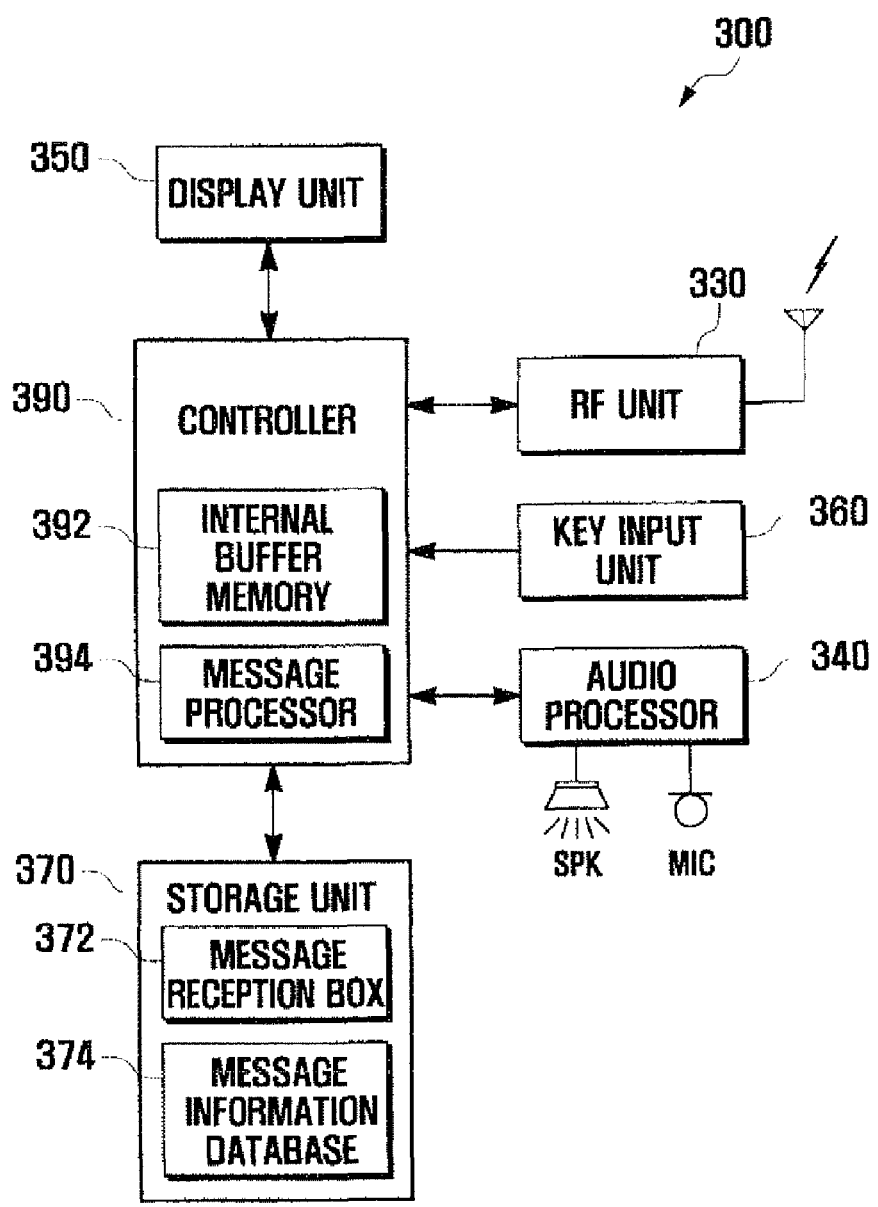
FIG. 10 is a block diagram showing a configuration of a mobile communication terminal according to another exemplary embodiment of the present invention.

FIG. 9 is a block diagram showing a system for displaying message information according to another exemplary embodiment of the present invention. FIG. 10 is a block diagram showing the configuration of a mobile communication terminal according to another exemplary embodiment of the present invention.

Referring to FIG. 9, a message server 400 includes a message management unit 402 and a message storage unit 404.

The message server 400 receives and stores a message transmitted from a transmitting terminal and transmits the message to a receiving mobile communication terminal 300.

The message storage unit 404 stores a message transmitted from the transmitting terminal.

If a message is transmitted from the transmitting terminal, the message management unit 402 stores the message in the message storage unit 404 and transmits the stored message to the receiving mobile communication terminal 300. The message management unit 402 generates a message by coupling an identifier and the call back number of the most recently stored message to basic information about a message that has been stored for the longest period of time, and transmits the generated message.

Referring to FIG. 10, the mobile communication terminal 300 includes a message information database 374 and message processor 394, in addition to an RF unit 330, an audio processor 340, a display unit 350, a key input unit 360, a storage unit 370, and a controller 390. Elements other than the storage unit 370 and controller 390 perform the same function as those of the previously described exemplary embodiment and thus, a description thereof is omitted.

The storage unit 370 includes program memory and data memory. Programs to control the general operation of the mobile communication terminal 300 are stored in the program memory and data generated while performing programs is stored in the data memory. Further, the storage unit 370 includes a message reception box 372 and the message information database 374.

In the message reception box 372, messages, i.e. text messages using an SMS, transmitted from the message server 400 are stored.

If a message cannot be stored because sufficient space to store the message does not exist in the message reception box 372, information about the received message is stored in the message information database 374. For this, the message information database 374 includes a message identifier field, a center time stamp field, and a call back number field.

FIG. 11A, FIG. 11B, FIG. 11C, FIG. 11D, and FIG. 11E are diagrams showing a structure of the message information database 374 of the mobile communication terminal 300 of FIG. 10.

Referring to FIG. 11A, FIG. 11B, FIG. 11C, FIG. 11D, and FIG. 11E, a message identifier for displaying a message identifier of the received message is stored in the message identifier field. The time at which the message is first stored in the message server 400 is stored in the center time stamp field, and the number of a sender's mobile communication terminal or a reply number input by the sender is stored in the call back number field. In the present exemplary embodiment, it is determined whether a received message is a first transmitted message or a re-transmitted message using center time stamp information. However, the present invention is not limited thereto and may use various information (e.g. a message size or a part of user data) that may be extracted from the transmitted message. The operation of the message information database 374 is described in detail in the method of displaying message information, described below with reference to FIG. 12.

The controller 390 performs the general control operation of the mobile communication terminal 300, and includes the message processor 394.

The message processor 394 extracts message information about the corresponding message, when sufficient space to store the message does not exist in the message reception box 372, and stores the message information in the message information database 374. Further, the message processor 394 displays information about messages for which reception is rejected to a user based on the message information database 374 and simultaneously transmits a message storage disallowance signal to the message server 400.

Figure 13:
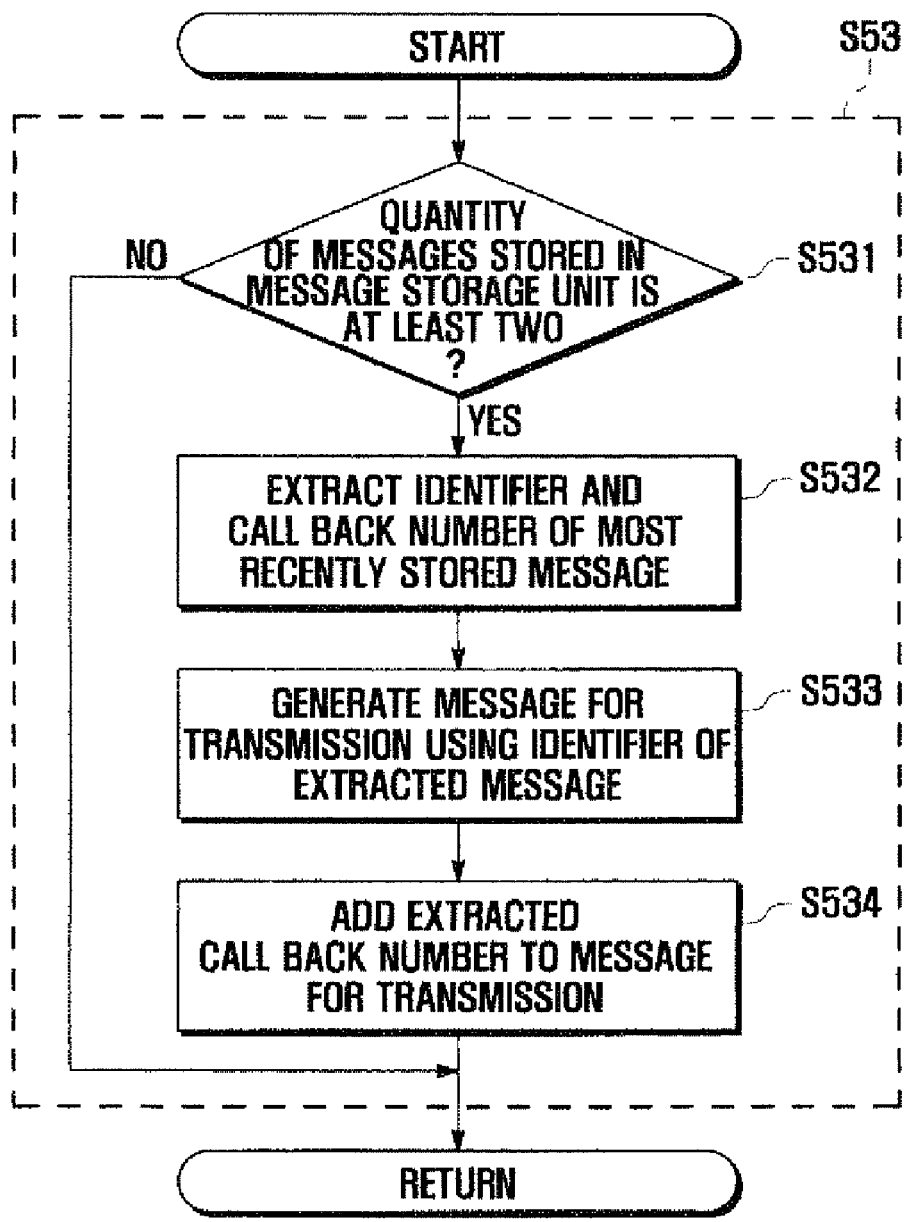
FIG. 13 is a flowchart showing a process of generating a message for transmission in the method of FIG. 12.
Figure 14:
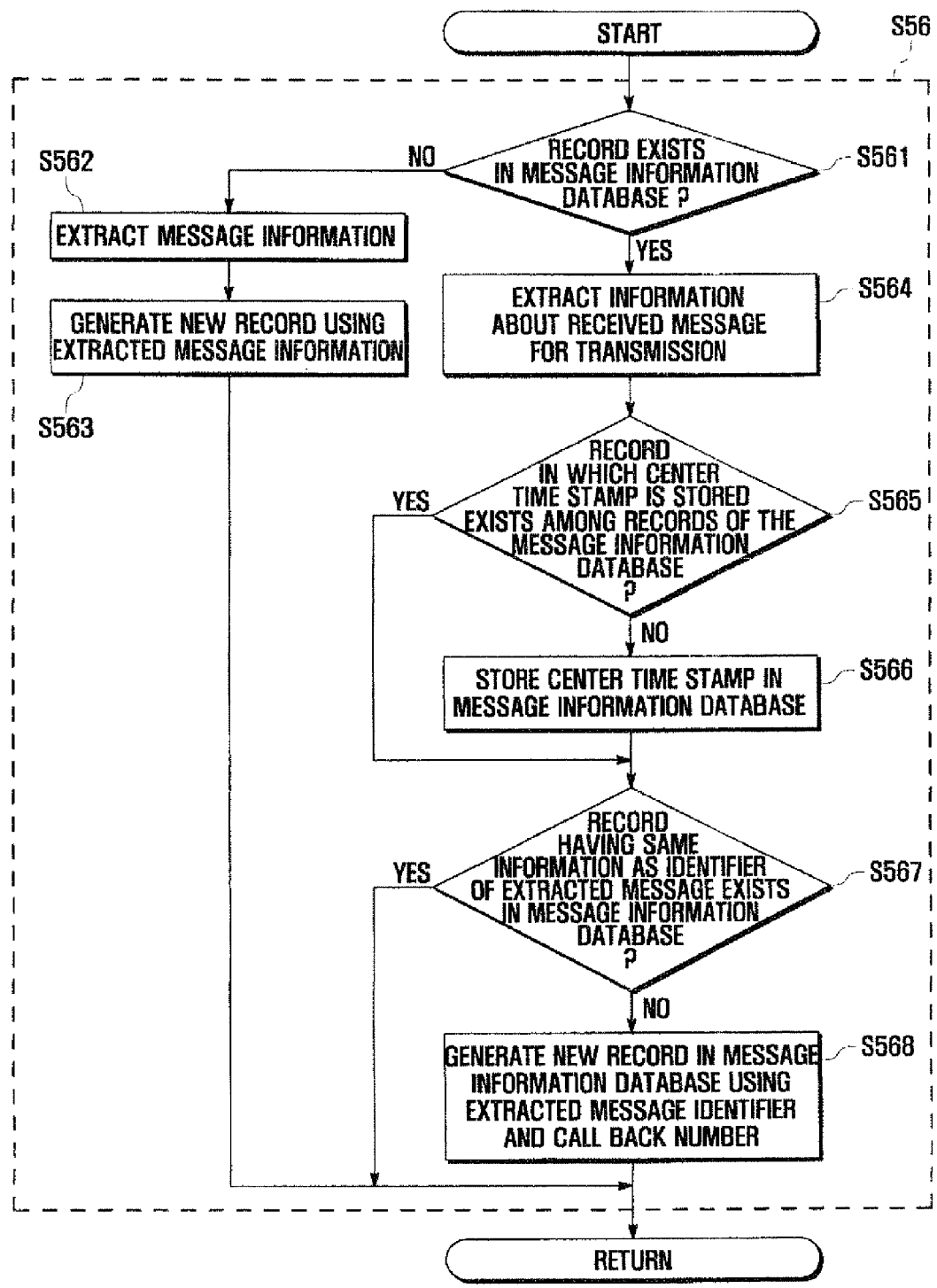
FIG. 14 is a flowchart showing a process of storing message information in the method of FIG. 12.

FIG. 12 is a flowchart showing a method of displaying message information according to another exemplary embodiment of the present invention. FIG. 13 is a flowchart showing a process of generating a message in the method of FIG. 12. FIG. 14 is a flowchart showing a process of storing message information in the method of FIG. 12.

Referring to FIG. 9, FIG. 10, FIG. 11A, FIG. 11B, FIG. 11C, FIG. 11D, FIG. 11E, FIG. 12, FIG. 13, and FIG. 14, the mobile communication terminal 300 commences in a standby state (S50). If a message is received in the message server 400 (S51), the message management unit 402 stores the received message in the message storage unit 404 (S52). Next, the message management unit 402 generates a message (S53).

Referring to FIG. 13, the message management unit 402 determines whether the quantity of messages stored in the message storage unit 404 is at least two (S531). If the quantity of messages stored in the message storage unit 404 is only one, i.e. if only the message received at step S51 is stored, the process continues at step S54 without performing other processes. If the quantity of messages stored in the message management unit 402 is at least two, the message storage unit 404 extracts an identifier and call back number of the message most recently stored in the message storage unit 404 (S532).

The message management unit 402 generates a message using both the extracted identifier of the most recently stored message, and the message that has been stored for the longest period of time among the messages stored in the message storage unit 404 (S533).

In the present exemplary embodiment, in order to determine the quantity of messages stored in the message server 400, a message including the message that has been stored for the longest period of time and information about the message most recently stored is generated and then transmitted.

The message management unit 402 generates a message using basic information (e.g. center time stamp and user data) about the message that has been stored for the longest period of time and in this process, the message management unit 402 replaces a message identifier of a message identifier parameter with a message identifier of the most recently stored message and stores the message identifier. Further, the message management unit 402 extracts the call back number of the most recently stored message and adds the call back number to a specific reserved field of the message through the same method as that in the described exemplary embodiment (S534). The message generated according to this process includes basic information about the message that has been stored for the longest period of time, and the identifier of the most recently stored message is stored in the message identifier parameter and the call back number of the most recently stored message is stored in a specific reserved field.

Returning to FIG. 12, when the message has been generated at step S53, the message management unit 402 transmits the message to the receiving mobile communication terminal 300 (S54). Accordingly, the controller 390 receives the message and determines whether sufficient space to store the message exists in the message reception box 372 (S55). If sufficient space to store the message exists in the message reception box 372, the controller 390 stores the message for transmission (S61). If sufficient space to store the message does not exist in the message reception box 372, the controller 390 notifies the message processor 394 that sufficient space to store the message does not exist in the message reception box 372.

The message processor 394 stores information about the message in the message information database 374 (S56). As shown in FIG. 14, the message processor 394 determines whether a record already exists in the message information database 374 (S561). If a record does not already exist in the message information database 374, the newly received message is a first transmitted message and not a re-transmitted message. In the case of the first transmitted message, because the message management unit 402 does not generate a message in steps S532, S533, and S534 but rather, just transmits a message stored in the message storage unit 404, the message processor 394 extracts a message identifier, a center time stamp, and a call back number from the received message (S562) and generates a new record (R1 of FIG. 11A) in the message information database 374 using the extracted message information (S563). Because the received message is not a message to be transmitted, a call back number is not stored in a specific reserved field. Accordingly, the message processor 394 extracts and stores a call back number in a call back number parameter.

If at least one record already exists in the message information database 374, the corresponding record displays information about a message previously received but not stored, and thus the message processor 394 recognizes that a newly received message is a re-transmitted message, i.e. a message to be transmitted.

In this case, the message processor 394 extracts information about the message to be transmitted (S564). That is, the message processor 394 extracts a message identifier from the message identifier parameter of the received message, a call back number from the specific reserved field, and a center time stamp from the message center time stamp parameter. Here, the center time stamp is information about the message that has been stored for the longest period of time in the message server 400, and the message identifier and call back number are information about the message most recently stored in the message server 400.

Next, the message processor 394 determines whether a record in which a center time stamp is stored exists among records of the message information database 374 (S565).

If a record in which a center time stamp is stored exists, it means that the newly received message for transmission is a message having the same basic information as that of the previously received message. Accordingly, if a record R1 in which a center time stamp is stored exists as in FIG. 11A, the process enters step S567.

If no record exists in which a center time stamp is stored, i.e. if all stored records have no center time stamp, it means that a new message, not a message previously transmitted, has been transmitted. Accordingly, if no record in which a center time stamp is stored exists as in FIG. 11B, the message processor 394 stores a center time stamp in a center time stamp field of the corresponding record R1 of the message information database 374 (S566). FIG. 11B shows a case where only one record R1 exists. However, when a plurality of records exists, the center time stamp is stored in the first record R1 of the database 374, i.e. the record R1 that has been generated for the longest period. When the center time stamp is stored in the corresponding record R1, the message information database 374 having a format shown in FIG. 11B has a format shown in FIG. 11A.

Next, the message processor 394 determines whether a record having the same message identifier as that extracted in step S564 exists in the message information database 374 (S567). If a record having the same message identifier as that extracted in step S564 does not exist in the message information database 374, the received message is a new message. Accordingly, the message processor 394 generates a new record R2 in the message information database 374 using the extracted message identifier and call back number as in FIG. 11C (S568). Because both the message identifier and call back number are information about a message newly received in the message server 400, both the message identifier and call back number are stored in the same record R2.

If a record having the same message identifier as that extracted in step S564 already exists in the message information database 374, the received message is a message generated by messages received before and stored in the message server 400. That is, a new message is not received in the message server 400. Subsequently, the process continues at step S57 (shown in FIG. 12).

Through the described process, the quantity of messages generated and sustained in the message information database 374 is the same as that of messages stored in the message server 400.

It is assumed that the message information database 374 has the same structure as that of FIG. 11D.

FIG. 11D shows that two new messages are further received in the message server 400 when the message information database 374 has the same structure as that in FIG. 11C and shows the message information database 374 in which a total of 4 records (R1, R2, R3, and R4) are generated and stored as a message to be transmitted to the receiving mobile communication terminal 300.

Returning to FIG. 12, the message processor 394 transmits a message storage disallowance signal to the message server 400 (S57). The message processor 394 simultaneously displays a pop-up message (as shown in FIG. 8) notifying the user that a message cannot be stored because sufficient space to store the message does not exist in the message reception box 372 in the display unit 350 (S58). In this process, the message processor 394 calculates the quantity of records stored in the message information database 374 and displays the quantity of messages in which reception is rejected. In FIG. 11D, because the quantity of records is '4', '4' is displayed as the quantity of messages. Further, the message processor 394 extracts and displays a call back number stored in a call back number field, and when the call back number is stored in a phone book of the receiving mobile communication terminal 300 as in the described exemplary embodiments, the message processor 394 extracts the sender's name corresponding to the call back number and displays both the call back number and sender's name.

The pop-up message according to the present exemplary embodiment is similarly displayed with the pop-up message of the described exemplary embodiments and thus, a description thereof is omitted.

After a predetermined amount of time from the point at which the message storage disallowance signal is received at step S57 from the mobile communication terminal 300 (S59), the message management unit 402 of the message server 400 returns to step S54 and repeats the process of transmitting a message for which storage was rejected.

If however, when storage of the message is rejected, prior to the elapse of the predetermined amount of time after receiving the message storage disallowance signal at step S59, a new message is received in the message server 400 (S60), the message management unit 402 returns to step S52 and repeats the process of generating a message for transmission.

At step S55, if a user of the receiving mobile communication terminal 300 secures sufficient space to store the message in the message reception box 372 while the described process are performed, the message processor 394 stores a message (e.g. the message corresponding to R1) (S61). If the received message is a message to be transmitted, in the process of storing the message, the message processor 394 replaces the message identifier with a message identifier of the longest-stored record in the message information database 374 and stores the message identifier with the newly-stored message. If the received message is not a message to be transmitted, the message processor 394 stores only the corresponding message.

When storage of the message is complete, the message processor 394 deletes the corresponding message information (S62). The message processor 394 determines whether a record having the same information as a center time stamp of the message stored at step S61 is stored in the message information database 374. If a record having the same information as a center time stamp of the message stored at step S61 is already stored in the message information database 374, the message processor 394 deletes the corresponding record (R1 of FIG. 11D). Accordingly, as in FIG. 11E, the quantity of records in the message storage database 374 decreases by 1. Therefore, only records having no center time stamp exist in the message information database 374.

When deletion of the corresponding message is complete, the message processor 394 transmits a signal indicating that storage of the message is complete to the message server 400 (S63). Accordingly, the message management unit 402 deletes a message corresponding to the message stored in the receiving mobile communication terminal 300 from the message storage unit 404 (S64). Accordingly, the total quantity of messages stored in the message server 400 is identical to the total quantity of records stored in the message information database 374.

Next, the message management unit 402 determines whether other messages are stored in the message storage unit 404 (S65).

If other messages are stored in the message storage unit 404, the message management unit 402 returns to the process of modifying message information at step S53 and repeats the described processes thereafter.

If there is no other messages stored in the message management unit 402 at step S65, the message server 200 enters into a standby state. Then, if a new message is received, the message server 200 goes to step S11 and repeats the described processes.

As described above, a method of displaying message information according to the present exemplary embodiment displays the quantity of messages stored in the message server 400 and the call back number of the message most recently stored in the message server 400 through a pop-up message. However, the present invention is not limited thereto, but may display information (e.g. a call back number or center time stamp) about the records stored in the message information database 374 along with the above information when displaying the pop-up message.

A method and system for displaying message information according to the present exemplary embodiment display information (quantity and call back number) about messages stored in the message server without being stored in the mobile communication terminal to a user through a pop-up message. Accordingly, the user may be notified that a message cannot be received because sufficient space to store the message does not exist in the message reception box and also, how many messages are stored in the message server, through the pop-up message.

Accordingly, in order to receive and store messages for which storage is rejected in a bundle, the user may delete a number of stored messages equal to or more than the quantity displayed in the pop-up message. Further, because the user may easily recognize the sender of a message for which reception is rejected, when the message for which reception is rejected is potentially an important message, the message may be quickly received.

A method and system for displaying message information according to exemplary embodiments of the present invention are not limited thereto, but may be modified while still falling within the scope of the present invention. For example, in the described exemplary embodiment, when a pop-up message is displayed, a method of displaying only the call back number of the message for which a request for receiving is most recently input is displayed. However, the present invention is not limited thereto and both the call back number and message information (i.e. a center time stamp) stored in a message information database may be displayed or a plurality of information may be selectively displayed.

Further, in the present exemplary embodiments, a pop-up message is used to display the quantity of messages for which reception is rejected or the sender's information. However, the present invention is not limited thereto, but may use various methods, such as a method of displaying by scrolling a caption, a method of displaying an icon or character (e.g. avatar), or a method of outputting a voice through an audio processor, in order to notify the user of the rejection.

Further, in the present exemplary embodiments, a method and system for displaying message information with an SMS are described, however the present invention may be applied to contents that may be received through a mobile communication terminal, such as an E-mail or emoticon.

As described above, a method and system for displaying message information according to the present invention display information about messages stored in a message server to a user because sufficient space to store the message does not exist in a message reception box. Accordingly, the user may easily recognize the quantity of messages and message information stored in the message server. Further, because the user may delete messages stored in the message reception box according to the quantity of messages stored in the message server, when receiving a message a second time, messages for which reception is rejected may be stored in a bundle.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for displaying message information in a mobile communication terminal, comprising:
    determining, when a message is received by the mobile communication terminal, whether sufficient space to store the message exists in the mobile communication terminal;
    extracting, by the mobile communication terminal, if sufficient space to store the message does not exist, information about the received message, comprising a call back number; and
    displaying a message comprising a phrase informing that the received message cannot be stored in the mobile communication terminal and the extracted information comprising the call back number.

2. The method of claim 1, wherein the extracted information about the received message further comprises at least one of a message center time stamp and user data.

3. The method of claim 1, wherein determining whether sufficient space to store the message exists comprises:
    receiving a message from outside the mobile communication terminal;
    temporarily storing the received message; and
    determining whether sufficient space to store the received message exists.

4. The method of claim 3, wherein temporarily storing the received message comprises storing the received message in internal buffer memory.

5. A method for displaying message information using a message server and a mobile communication terminal, comprising:
- storing, by the message server, at least two messages according to a message storage disallowance state of the mobile communication terminal;
- generating, by the message server, a message for transmission including message information comprising a call back number from the stored messages;
- transmitting, by the message server, the message for transmission to the mobile communication terminal;
- receiving, by the mobile communication terminal, the message for transmission;
- extracting, by the mobile communication terminal, the message information comprising the call back number from the received message for transmission; and
- displaying the message information,
- wherein the message information included in the message for transmission comprises an identifier of the most recently stored message and a call back number of the most recently stored message, and
- the message for transmission is composed of a message that has been stored for the longest period of time and the message information.

6. The method of claim 5, wherein the message information comprises the quantity of the messages stored in the message server.

7. The method of claim 6, wherein the message information further comprises a call back number of a message that was the most recently received among the messages stored in the message server.

8. The method of claim 5, wherein the message information comprises an identifier of a message that was the most recently received among the messages stored in the message server.

9. The method of claim 8, wherein the message information further comprises a call back number of the most recently received message.

10. The method of claim 9, wherein the message information displayed from the message comprises the quantity of the messages stored in the message server and call back numbers of the messages.

11. The method of claim 10, wherein the message information displayed from the message further comprises a sender's name corresponding to the call back number.

12. The method of claim 5, further comprising:
- determining, by the mobile communication terminal, whether sufficient space to store the received message exists in the mobile communication terminal;
- storing, by the mobile communication terminal, if sufficient space to store the received message does not exist in the mobile communication terminal, the extracted message information from the received message; and
- transmitting, by the mobile communication terminal, a message storage disallowance signal to the message server.

13. The method of claim 12, wherein the message information comprises the quantity of messages stored in the message server.

14. The method of claim 12, wherein the message information comprises an identifier of a message that was the most recently received in the message server.

15. The method of claim 14, wherein the message information further comprises a call back number of the message most recently received in the message server.

16. The method of claim 14, wherein storing message information from the received message comprises:
- storing the extracted message information in a message information database, the message information including the identifier of the message that was most recently received in the message server.

17. The method of claim 16, wherein storing the extracted message information in a message information database comprises generating, if a message identifier identical to the message identifier does not exist in the message information database, a new record in the message information database using the message identifier.

18. The method of claim 16, further comprising:
- storing, if sufficient space to store the received message exists in the mobile communication terminal, the received message; and
- deleting a record corresponding to the message stored in the message information database.

19. The method of claim 12, further comprising displaying the message storage disallowance signal including the message information.

20. The method of claim 5, wherein the message information included in the message comprises the quantity of the stored messages.

21. The method of claim 5, wherein the message information further comprises a call back number of the most recently stored message.

22. A system for displaying message information, comprising:
- a message server comprising:
    - a message storage unit to store at least two messages according to a message storage disallowance signal, and
    - a message management unit to generate a message for transmission comprising message information comprising a call back number using messages stored in the message storage unit and to transmit the message to a mobile communication terminal; and
- a mobile communication terminal comprising:
    - a message processor to receive the message for transmission from the message server, to determine whether sufficient space to store the message exists in the mobile communication terminal, to extract and store, if sufficient space to store the message does not exist, the message information comprising the call back number, and to transmit a message storage disallowance signal to the message server, and
    - a display unit to display the message information comprising a phrase informing that the received message cannot be stored in the mobile communication terminal and the extracted information,
- wherein the message information comprises an identifier of the most recently stored message and a call back number of the most recently stored message, and
- the message for transmission is composed of a message that has been stored for the longest period of time and the message information.

23. The system of claim 22, wherein the message information comprises the quantity of the messages stored in the message storage unit.

24. The system of claim 22, wherein the message information is stored in a message information database.

* * * * *